United States Patent

Hasushita

[11] Patent Number: 5,317,451
[45] Date of Patent: May 31, 1994

[54] ALBADA FINDER

[75] Inventor: Sachio Hasushita, Tokyo, Japan

[73] Assignee: Asahi Kogaku Kogyo Kabushiki Kaisha, Tokyo, Japan

[21] Appl. No.: 946,646

[22] Filed: Sep. 18, 1992

[30] Foreign Application Priority Data

Sep. 19, 1991 [JP] Japan .................. 3-313009

[51] Int. Cl.$^5$ .................. G02B 25/00; G02B 17/00
[52] U.S. Cl. .................. 359/643; 359/726; 359/734; 354/219; 354/224
[58] Field of Search .............. 359/781, 646, 726, 734, 359/643–645; 354/224, 219

[56] References Cited

U.S. PATENT DOCUMENTS

| | | | |
|---|---|---|---|
| 4,348,090 | 9/1982 | Iizuka | 354/224 |
| 4,429,978 | 2/1984 | Ikari | 359/644 |
| 4,595,270 | 6/1986 | Yamada et al. | 354/222 |
| 4,812,023 | 3/1989 | Kikuchi | 359/713 |
| 4,828,374 | 5/1989 | Ishisaka et al. | 359/708 |

FOREIGN PATENT DOCUMENTS

| | | |
|---|---|---|
| 57-624 | 1/1982 | Japan . |
| 57-168214 | 10/1982 | Japan . |
| 58-216218 | 12/1982 | Japan . |
| 63-218912 | 9/1988 | Japan . |

Primary Examiner—Loha Ben
Assistant Examiner—James Phan
Attorney, Agent, or Firm—Sandler Greenblum & Bernstein

[57] ABSTRACT

An albada finder comprising an objective lens group, which includes two negative lenses, and an eyepiece lens group, which includes two positive lenses, arranged in this order from the object side. A view frame is formed on the object side surface of the eyepiece lens group, and a half mirror is formed on the eye point side surface of the objective lens group. The finder satisfies the following condition:

$$LD/lf \geq 2 \qquad (1)$$

wherein,

LD is the lens full length (distance from the 1st surface to the 8th surface), and Lf is the eye relief (distance from the 8th surface to an eye point).

2 Claims, 7 Drawing Sheets

—— LINE d
······ LINE g
---- LINE c

-0.5    0.5
SPHERICAL ABERRATION
CHROMATIC ABERRATION

-0.05  0.05
ASTIGMATISM

-0.5   0.5%
DISTORTION

Fig-9A ASTIGMATISM

Fig-9B DISTORTION

ALBADA FINDER

BACKGROUND OF THE INVENTION

1. Field of the Invention

This invention relates to an albada finder of which a view frame is formed on an object side surface of an eyepiece lens group, and a half mirror is formed on an eye point side surface of an objective lens group.

2. Description of the Prior Art

For example, the conventional albada finder is disclosed by Japanese Laid Open Publication No. Sho 57-624. The finder of the publication is composed of an objective lens group, which consists of two negative lenses, and an eyepiece lens group which consists of two positive lenses arranged in this order from the object side.

A view frame is formed on the object side surface of the eyepiece lens group, and a half mirror is formed on the eye point side surface of the objective lens group. An user can observe the image of the view frame reflected by the half mirror and the photographic subject image passed through the half mirror in an overlapping fashion.

In this specification, distance from the 1st surface of the finder system to the 8th surface (the last surface) is defined as lens full length, distance from the 8th surface to an eye point is defined as eye relief, and sum of the lens full length and eye relief is defined as finder full length.

Since the above-mentioned conventional albada finder has a short lens full length from the 1st surface to the 8th surface, it has the long eye relief in order that the finder full length coincides with thickness of a camera body. Although eye relief of the finder for cameras is about 15 mm in general, the eye relief of the finder of the above mentioned publication is 20 mm.

However, since the conventional albada finder has a short lens full length, the 4th lens, which is disposed in the most eye point side, is mounted inside a camera body at a position spaced from the back side of the camera body. For this reason, if the cover glass is not prepared, dust will enter the space formed behind the 4th lens of the finder, and it is difficult to remove the dust.

Moreover, since the conventional albada finder has a large distance between an eye and the eyepiece lens group, it must enlarge the diameter of an eyepiece lens group in order to obtain the proper visual angle.

SUMMARY OF THE INVENTION

This invention has been constructed in order to solve the above-mentioned problems. The object of the present invention is to provide an albada finder which has a long lens full length in order to coincide the finder full length with the thickness of a camera body.

The albada finder of the present invention is characterized in that the finder has an objective lens group which consists of two negative lenses and an eyepiece lens group which consists of two positive lenses arranged in this order from the object side. A view frame is formed on the object side surface of the eyepiece lens group, and a half mirror is formed on the eye point side surface of the objective lens group, with the finder satisfying the following condition:

$$LD/Lf \geq 2 \qquad (1)$$

wherein
LD is a lens full length (distance from the 1st surface to the 8th surface), and
Lf is the eye relief (distance from the 8th surface to an eye point).

DETAILED DESCRIPTION OF THE EMBODIMENTS

The embodiment of the present invention will now be described hereinafter with reference to the drawings. The present disclosure relates to subject matter contained in Japanese patent applications Nos. H3-313009 (filed on Sep. 19, 1991) and H4-242929 (filed on Sep. 11, 1992) which are expressly incorporated herein by references in their entireties.

Figure 1:
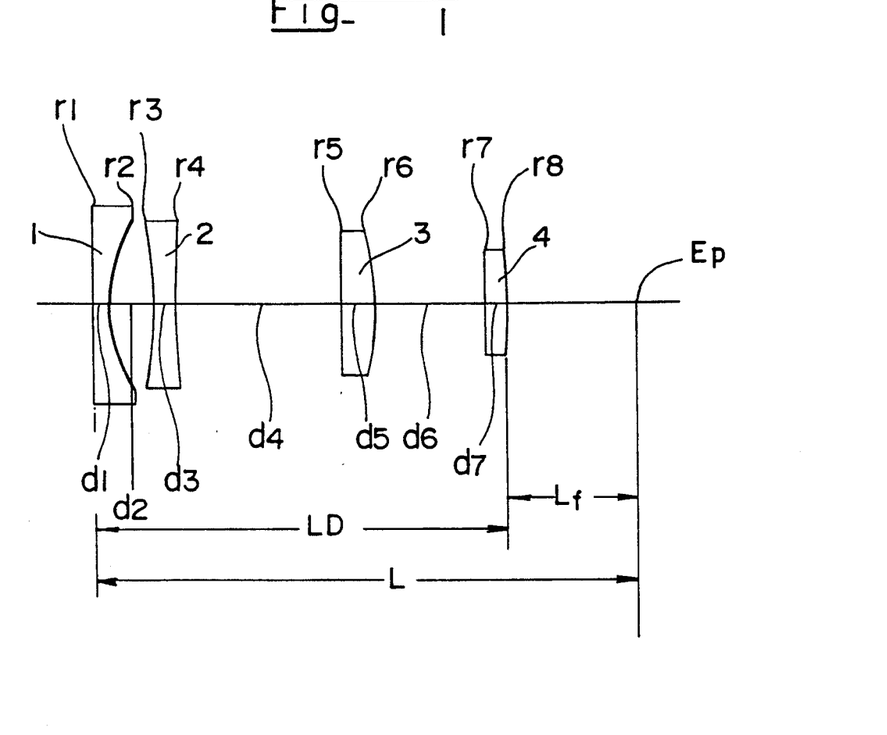
FIG. 1 is a lens diagram showing Embodiment 1 of an albada finder according to the present invention.

As shown in FIG. 1, the albada finder of an embodiment has an objective lens group which consists of two negative lenses 1, 2 and an eyepiece lens group which consists of two positive lenses 3, 4 arranged in this order from the object side. A view frame is formed on the 5th surface, and a half mirror is formed on the 4th surface. The finder satisfies the following condition:

$$LD/Lf \geq 2 \qquad (1)$$

wherein
LD is the lens full length (distance from the 1st surface to the 8th surface), and
Lf is the eye relief (distance from the 8th surface to an eye point).

The above mentioned condition (1) is the condition for lengthening finder full length by lengthening lens full length, without lengthening eye relief. The lens full length can be lengthened by satisfying this condition. Therefore, when thickness of a camera body is large, the 4th lens can be mounted at the back edge of the camera body, and adhesion of dust can be protected without preparing a cover glass. In other words, the 4th lens is not disposed inside the camera body, there is no space behind the 4th lens.

Furthermore, it is desirable that the distance d6 between the two lenses of the eyepiece lens group satisfies the following condition (2):

$$0.2 \leq d6/fAB \leq 0.5 \quad (2)$$

wherein fAB is the focal length of an albada optical system.

Here, the albada optical system is defined as the optical system to observe the view frame on the 5th surface reflected from the 4th surface through the 3rd lens and the 4th lens.

The condition (2) is to determine the distance between the two lenses of the eyepiece lens group for satisfying the conditions (1). If the lower limit of the condition (2) is exceeded, the lens full length LD becomes so short as not to match the thickness of a camera body, and the eye relief Lf should be lengthened. Therefore, the effective aperture of a lens becomes large when the eye ring has a sufficient size, and to obtain sufficient performance, an aspherical lens will need to be used. If upper limit is exceeded, the lens full length LD becomes too long.

Moreover, the albada finder of the embodiments satisfies the following conditions (3), (4), (5) and (6), wherein $$1.4|fo| < |fL1| < 1.9|fo| \quad (3)$$

$$1.9|fo| < |fL2| < 4.4|fo| \quad (4)$$

$$1.1fe < fL3 < 1.8fe \quad (5)$$

$$2.2fe < fL4 < 5.0fe \quad (6)$$

wherein
fo is the focal length of the objective lens group,
fe is the focal length of the eyepiece lens group,
fL1 is the focal length of the 1st lens,
fL2 is the focal length of the 2nd lens,
fL3 is the focal length of the 3rd lens, and
fL4 is the focal length of the 4th lens.

The conditions (3) and (4) are to determine the power distribution of the two lenses of the objective lens group. In order to correct distortion and coma aberration in the objective lens group which consists of two pieces of a single negative lens, it is desirable to distribute power of the whole objective lens group to each lens equally.

However, since the most eye point side surface of the objective lens group is used as a reflective surface, which reflects reflective light from a view frame, the power cannot be distributed equally to the negative lenses of the objective lens group. Then, most of the power of the objective lens group is distributed to the 1st lens, and the 2nd lens has power to act as a reflective surface.

If such power distribution is satisfied, the aberration characteristic of a photographic subject's normal virtual image, formed by the objective lens group, becomes good.

If the lower limit of the condition (3) is exceeded, it is difficult to correct distortion, maintaining the lens full length. If the upper limit is exceeded, the lens full length will become too long. When it constitutes an albada system, a view frame can be prepared in the 5th, 6th, 7th or 8th surfaces. When a view frame is prepared in the 5th surface according to this invention, the number of lenses light passes through, in a view frame, for the light to reach an eye becomes minimal. Therefore, the amount of light by the lens surface and the inside of the lens can be reduced, and can prevent a detrimental ghost to the minimum extent.

In addition, in general, higher accuracy is required for the distance between the 4th surface and the 5th surface than the other distances, because the view frame image travels back-and-forth between these surfaces. However, the albada finder of the present invention allows larger error for the distance between the 4th and 5th surfaces than a conventional albada finder.

The condition (4) is the condition for preparing the view frame in the 5th surface, maintaining the required lens full length. If the lower limit is exceeded, the lens full length becomes short. If the upper limit is exceeded, it is difficult to prepare the view frame on the 5th surface, and since the focal length of an albada system becomes too large, the diameter of a lens should be large in order to obtain sufficient appearance field of view.

If the 5th surface which prepares the view frame is planar, it is easier to form the view frame by vapor deposition, and the permission of the error of the distance between the 4th and 5th surfaces becomes larger. If the 5th surface has curvature, the vapor deposition of the view frame is more difficult, and the permission of error becomes smaller.

The conditions (5) and (6) are to determine the power distribution of the two lenses of the eyepiece lens group. In order to correct distortion and coma aberration in the eyepiece lens group, it is desirable to distribute the power of the whole eyepiece lens group to each lens equally. However, if the albada finder has a long distance between the two lenses of the eyepiece lens group in order to lengthen the lens full length, and has the same diameter of a lens as a conventional finder, it is difficult to distribute the power equally, and it is desirable to satisfy the conditions (5) and (6).

If the lower limit of the condition (5) is exceeded, the 3rd lens has such a large power as not to be able to correct the coma aberration outside an axis, and the 4th lens has such a small power as to exceed the upper limit of the condition (6) in order to keep the power of the eyepiece lens group proper.

If the upper limit of the condition (6) is exceeded, the diameter of the 1st lens to the 3rd lens must be enlarged because of a small power of the 4th lens, and the finder system becomes large size.

If the upper limit of the condition (5) is exceeded, the 4th lens has such a large power as to exceed the lower limit of the condition (6) in order to maintain the power of the eyepiece lens group. Moreover, since the distance between the 3rd lens and the 4th lens is not long enough, the finder full length cannot coincide with a camera body, when the camera body is thick.

EMBODIMENT 1

Figure 2A:
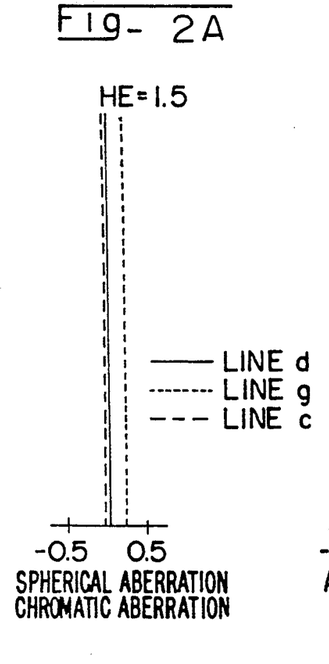
FIGS. 2A, 2B, and 2C are various aberration diagrams of the finder system of embodiment 1.
Figure 2B:
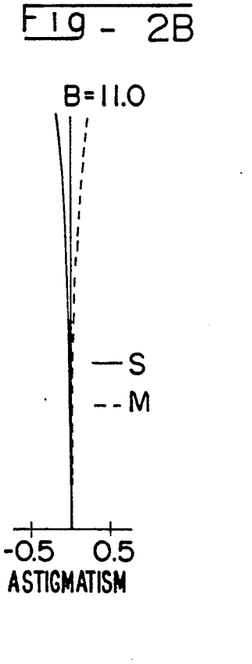
Figure 2C:
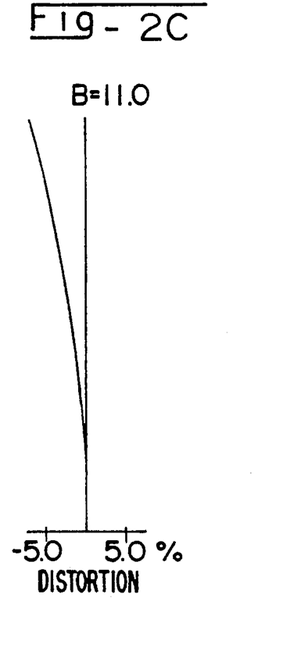
Figure 3A:
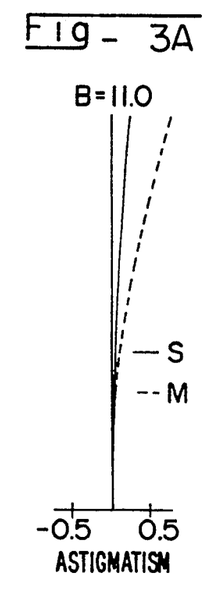
FIGS. 3A and 3B are various aberration diagrams of the albada system of embodiment 1.
Figure 3B:
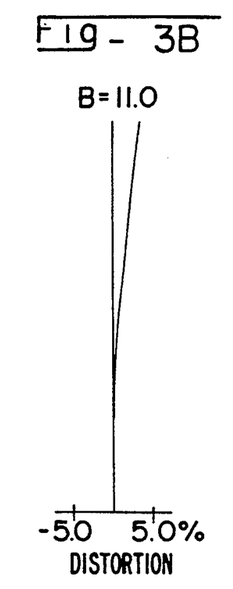

FIG. 1 is a lens diagram showing Embodiment 1 of an albada finder according to the present invention. Concrete numerical constructions are as shown in Table 1. Various aberrations of the finder system are shown in FIGS. 2A, 2B, and 2C, and various aberrations of the albada system are shown in FIGS. 3A and 3B.

In the table, the reference character L denotes finder full length, LD denotes lens full length, Lf denotes eye relief, fAB denotes focal length of an albada optical system, $\phi$ denotes diameter of an eye ring, r denotes the radius of curvature of a surface, d denotes a lens thickness or a spatial distance, n denotes a refractive index in a d-line (wavelength of 588 nm) of a lens and $\nu$ denotes an Abbe number. In addition, diopter Dpt of an aberration indicates the difference from the standard diopter.

Moreover, sign HE in the figure shows height (unit mm) of the pupil of a light beam on an axis, and B shows an exit angle (unit degree).

TABLE 1

L = 51.5  LD = 36.5  Lf = 15.0  fAB = 28.71  $\phi$ = 3 mm
Diopter of finder system    Finder magnification 0.42 times
−1.2Dpt(3 m)
Diopter of albada system    Loupe magnification 8.60 times
−1.3Dpt

| Surface number | r | d | n | $\nu$ |
|---|---|---|---|---|
| 1 | 1031.757 | 1.50 | 1.49176 | 57.4 |
| 2 | 14.086 | 3.74 | | |
| 3 | −39.549 | 2.00 | 1.49176 | 57.4 |
| 4 | 90.950 | 14.60 | | |
| 5 | ∞ | 3.00 | 1.49176 | 57.4 |
| 6 | −30.808 | 9.70 | | |
| 7 | ∞ | 1.96 | 1.49176 | 57.4 |
| 8 | −61.896 | | | |

EMBODIMENT 2

Figure 4:
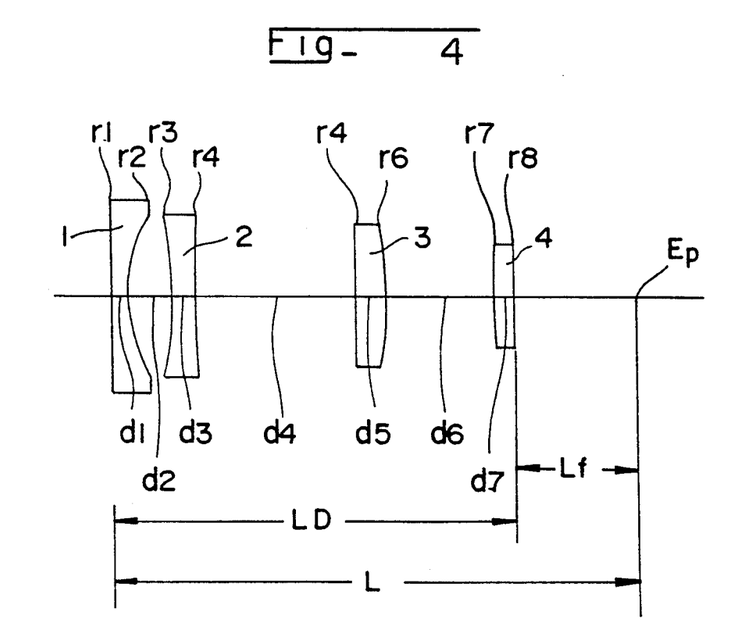
FIG. 4 is a lens diagram showing Embodiment 2 of an albada finder according to the present invention.
Figures 5A, 5B:
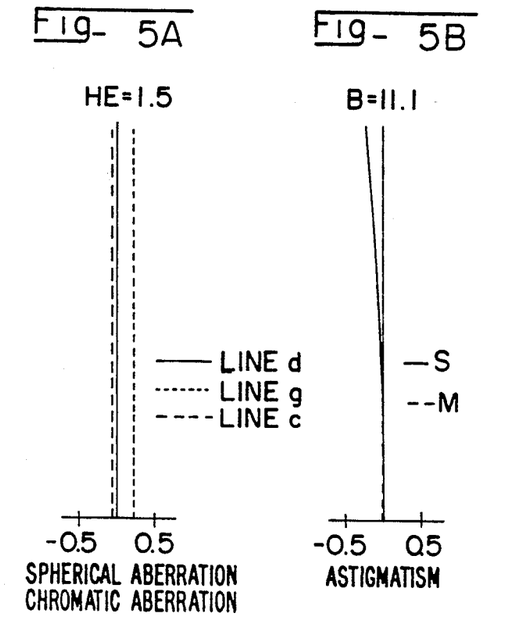
FIGS. 5A, 5B, and 5C are various aberration diagrams of the finder system of embodiment 2.
Figure 5C:
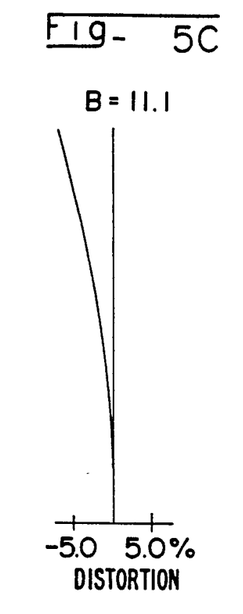
Figure 6A:
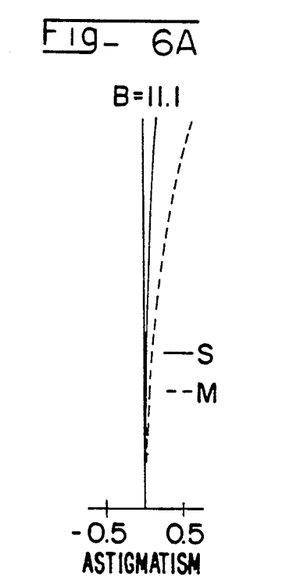
FIGS. 6A and 6B are various aberration diagrams of the albada system of embodiment 2.
Figure 6B:
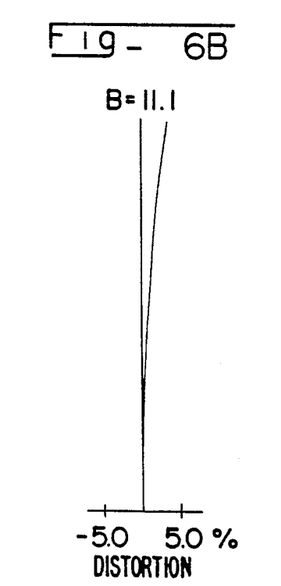

FIG. 4 is a lens diagram showing Embodiment 2 of an albada finder according to the present invention. Concrete numerical constructions are as shown in Table 2. Various aberrations of the finder system are shown in FIGS. 5A, 5B, and 5C, and various aberrations of the albada system are shown in FIGS. 6A and 6B.

TABLE 2

L = 51.5  LD = 36.5  Lf = 15.0  fAB = 28.70  $\phi$ = 3 mm
Diopter of finder system    Finder magnification 0.42 times
−1.2Dpt(3 m)
Diopter of albada system
−1.2Dpt    Loupe magnification 8.70 times

| Surface number | r | d | n | $\nu$ |
|---|---|---|---|---|
| 1 | 243.335 | 1.50 | 1.49176 | 57.4 |
| 2 | 13.618 | 3.88 | | |
| 3 | −34.254 | 2.00 | 1.49176 | 57.4 |
| 4 | 94.275 | 14.57 | | |
| 5 | ∞ | 3.00 | 1.49176 | 57.4 |
| 6 | −28.637 | 9.58 | | |
| 7 | 66.676 | 1.96 | 1.49176 | 57.4 |
| 8 | ∞ | | | |

EMBODIMENT 3

Figure 7:
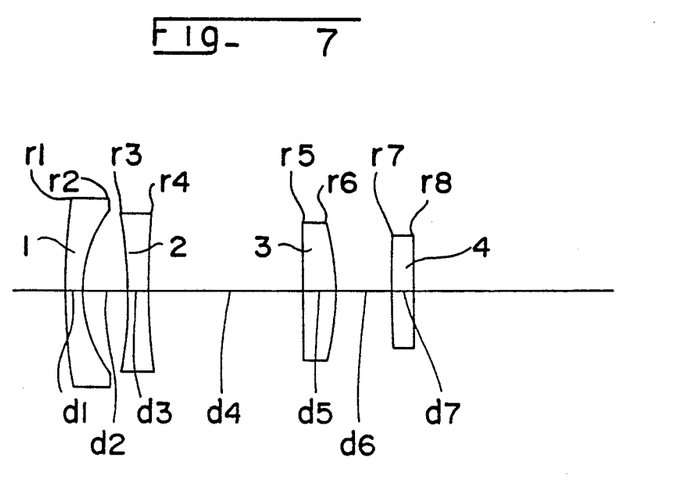
FIG. 7 is a lens diagram showing Embodiment 3 of an albada finder according to the present invention.
Figures 8A, 8B:
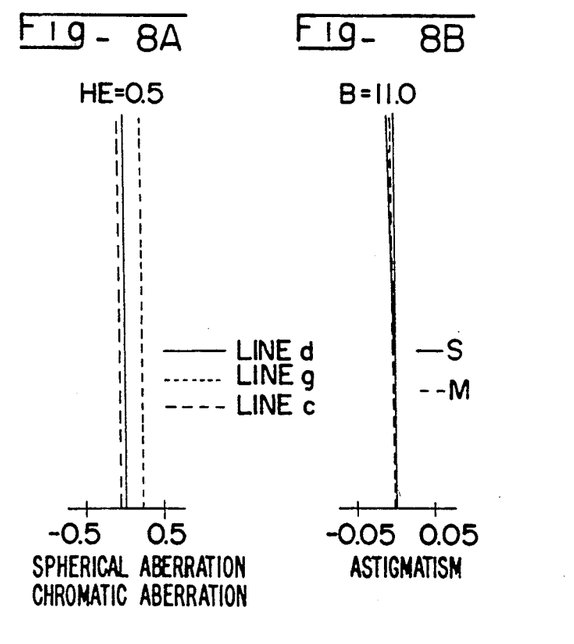
FIGS. 8A, 8B, and 8C are various aberration diagrams of the finder system of embodiment 3.
Figure 8C:
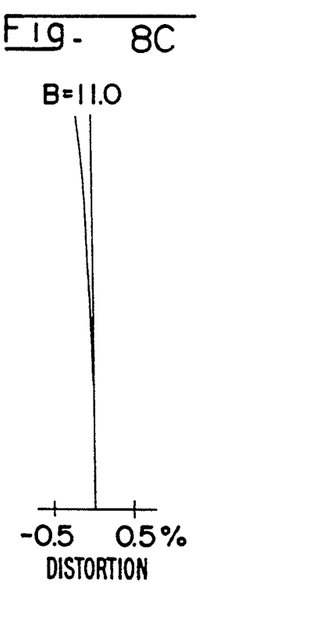
Figure 9A:
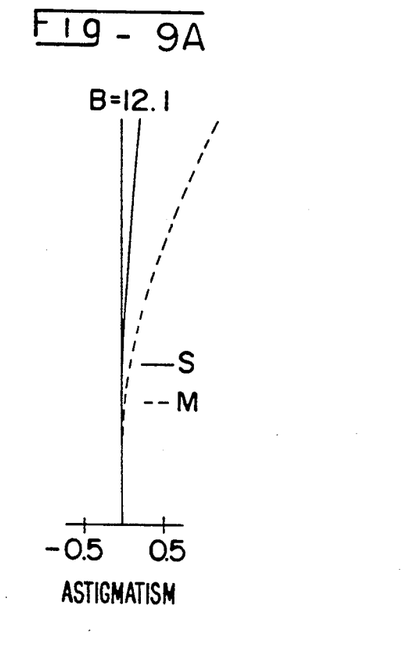
FIGS. 9A and 9B are various aberration diagrams of the albada system of embodiment 3.
Figure 9B:
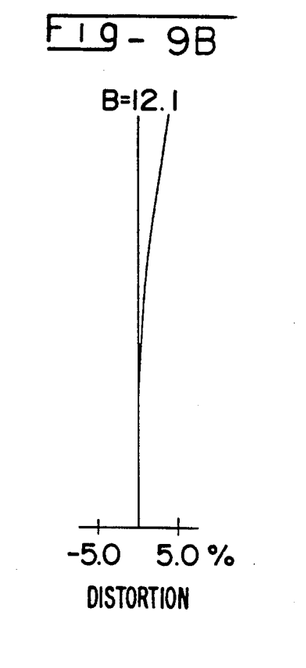

FIG. 7 is a lens diagram showing Embodiment 3 of an albada finder according to the present invention. Concrete numerical constructions are as shown in Table 3. Various aberrations of the finder system are shown in FIGS. 8A, 8B, and 8C and various aberrations of the albada system are shown in FIGS. 9A and 9B.

TABLE 3

L = 46.15  LD = 31.15  Lf = 15.0  fAB = 24.95  $\phi$ = 3 mm
Diopter of finder system    Finder magnification 0.46 times
−1.2Dpt(3 m)
Diopter of albada system    Loupe magnification 10.0 times
−1.1Dpt

| Surface number | r | d | n | $\nu$ |
|---|---|---|---|---|
| 1 | 82.837 | 1.50 | 1.49176 | 57.4 |
| 2 | 12.546 | 3.98 | | |
| 3 | −35.356 | 2.00 | 1.49176 | 57.4 |
| 4 | 77.002 | 13.67 | | |
| 5 | ∞ | 3.00 | 1.49176 | 57.4 |
| 6 | −25.070 | 5.00 | | |
| 7 | 80.470 | 2.00 | 1.49176 | 57.4 |
| 8 | ∞ | | | |

EMBODIMENT 4

Figure 10:
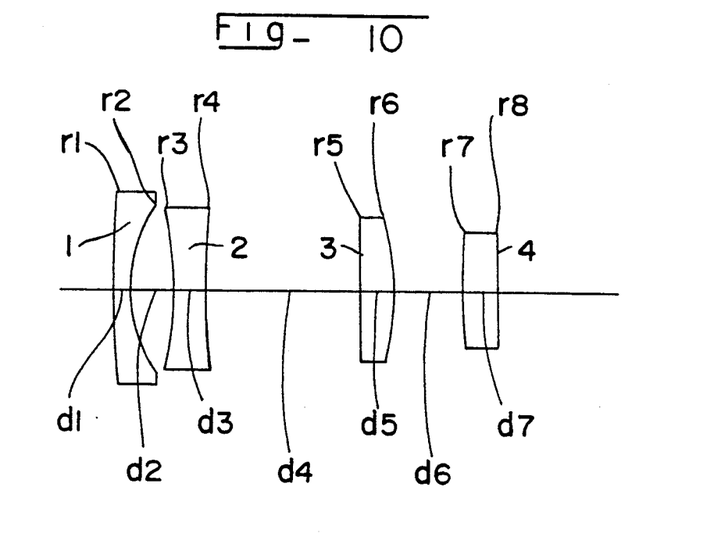
FIG. 10 is a lens diagram showing Embodiment 4 of an albada finder according to the present invention.
Figures 11A, 11B:
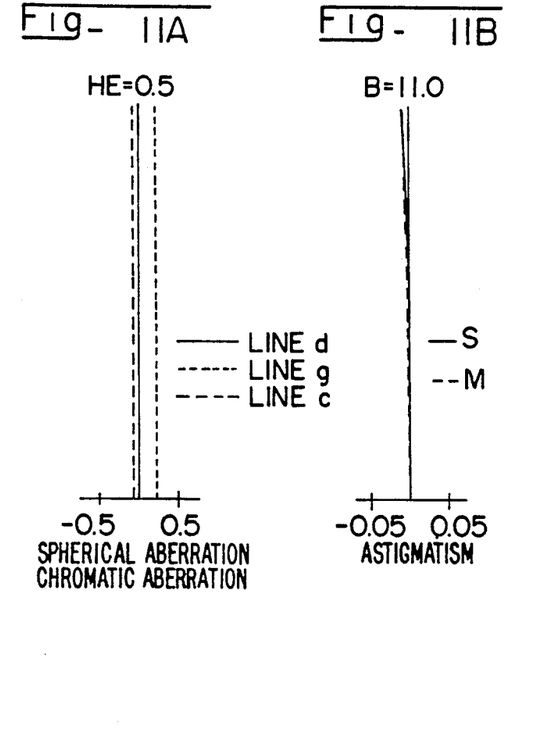
FIGS. 11A, 11B, and 11C are various aberration diagrams of the finder system of embodiment 4.
Figure 11C:
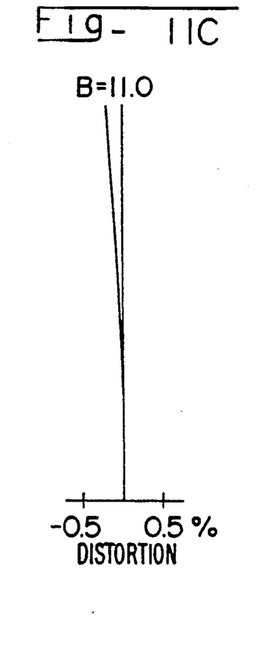
Figure 12A:
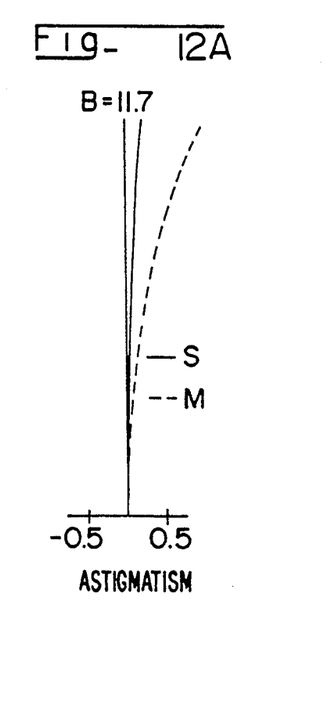
FIGS. 12A and 12B are various aberration diagrams of the albada system of embodiment 4.
Figure 12B:
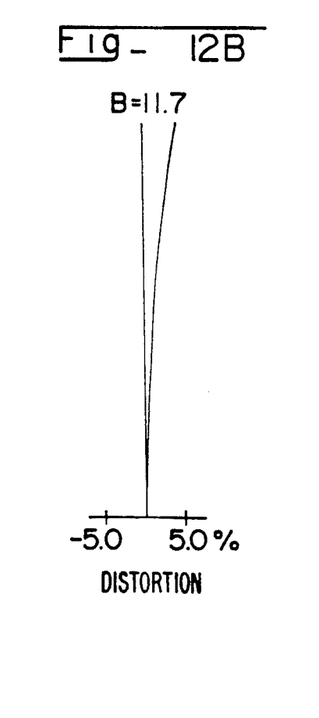

FIG. 10 is a lens diagram showing Embodiment 4 of an albada finder according to the present invention. Concrete numerical constructions are as shown in Table 4. Various aberrations of the finder system are shown in FIGS. 11A, 11B, and 11C, and various aberrations of the albada system are shown in FIGS. 12A and 12B.

TABLE 4

L = 49.0  LD = 34.00  Lf = 15.0  fAB = 24.97  $\phi$ = 3 mm
Diopter of finder system    Finder magnification 0.44 times
−1.2Dpt(3 m)
Diopter of albada system    Loupe magnification 10.0 times
−1.1Dpt

| Surface number | r | d | n | $\nu$ |
|---|---|---|---|---|
| 1 | 100.918 | 1.50 | 1.49176 | 57.4 |
| 2 | 13.029 | 3.77 | | |
| 3 | −32.916 | 3.00 | 1.49176 | 57.4 |
| 4 | 75.084 | 13.57 | | |
| 5 | ∞ | 3.00 | 1.49176 | 57.4 |
| 6 | −26.048 | 6.16 | | |
| 7 | 73.057 | 3.00 | 1.49176 | 57.4 |
| 8 | ∞ | | | |

Table 5 shows corresponding relations between the conditions (1)–(6) and each embodiment.

TABLE 5

| | (1) LD/Lf | (2) d6/fAB | fo | fe | fL1 | fL2 | fL3 | fL4 |
|---|---|---|---|---|---|---|---|---|
| Embodiment 1 | 2.43 | 0.34 | −18.22 | 44.42 | −29.06 | −55.77 | 62.65 | 125.87 |
| Embodiment 2 | 2.43 | 0.33 | −17.70 | 42.86 | −29.40 | −50.83 | 58.00 | 135.59 |
| Embodiment 3 | 2.10 | 0.20 | −17.77 | 39.80 | −30.28 | −48.99 | 50.98 | 163.64 |
| Embodiment 4 | 2.27 | 0.20 | −17.43 | 40.28 | −30.59 | −46.11 | 52.97 | 148.56 |

(3) $1.4|fo| < |fL1| < 1.9|fo|$

Embodiment 1   25.51 < 29.06 < 34.62
Embodiment 2   24.78 < 29.40 < 33.63
Embodiment 3   24.88 < 30.28 < 33.76
Embodiment 4   24.40 < 30.59 < 33.12

(4) $1.9|fo| < |fL2| < 4.4|fo|$

Embodiment 1   34.62 < 55.77 < 80.17
Embodiment 2   33.63 < 50.83 < 77.88
Embodiment 3   33.76 < 48.99 < 78.19
Embodiment 4   33.12 < 46.11 < 76.69

(5) $1.1fe < fL3 < 1.8fe$

Embodiment 1   48.86 < 62.65 < 80.00
Embodiment 2   47.15 < 58.00 < 77.15

TABLE 5-continued

| | | |
|---|---|---|
| Embodiment 3 | 43.78 < 50.98 < 71.64 | |
| Embodiment 4 | 44.31 < 52.97 < 72.50 | |
| (6) | $2.2fe < fL4 < 5.0fe$ | |
| Embodiment 1 | 97.72 < 125.87 < 222.1 | |
| Embodiment 2 | 94.29 < 135.59 < 214.3 | |
| Embodiment 3 | 87.56 < 163.64 < 199.0 | |
| Embodiment 4 | 88.62 < 148.56 < 201.4 | |

Figure 13A:
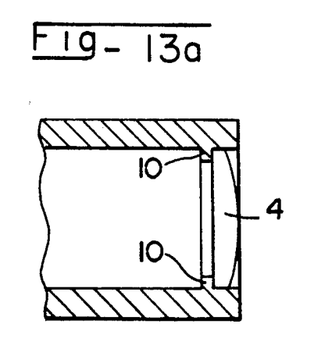
FIGS. 13(a) and 13(b) show assemblies of the 4th lens of an eyepiece lens group to the camera body.

When the plano-convex 4th lens is mounted to the camera body, if a support flange 10 is formed inside a body and the 4th lens 4 is installed from outside, as shown in FIG. 13 (a), it is not desirable that the support flange 10 comes in view of the finder.

Figure 13B:
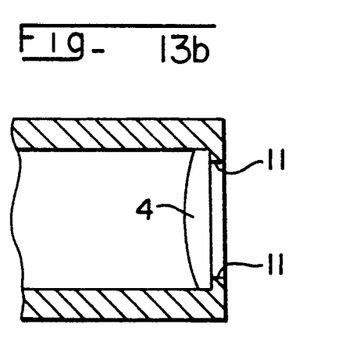

On the other hand, if a support flange 11 is formed at the back edge of the camera body and the 4th lens 4 is installed from the inside, as shown in FIG. 13 (b), it is desirable that the support flange 11 does not come in view of the finder.

What is claimed is:

1. An albada finder comprising an objective lens group, which includes of a 1st negative lens and a 2nd negative lens, and an eyepiece lens group, which includes a 3rd positive lens and 4th positive lens, arranged in this order from an object side, said eyepiece lens group being provided with a view frame on the object side surface, said objective lens group being provided with a half mirror on an eye point side surface, and satisfying the following condition:

$$LD/Lf \geq 2 \qquad (1)$$

wherein,

LD is a lens full length (distance from a 1st surface to an 8th surface), and

Lf is an eye relief (distance from the 8th surface to an eye point); and wherein said albada finder further satisfies the following condition:

$$0.2 \leq d6/fAB \leq 0.5 \qquad (2)$$

wherein, d6 is a distance between the third lens and the 4th lens, fAB is a focal length of an albada optical system.

2. An albada finder comprising an objective lens group, which includes of a 1st negative lens and a 2nd negative lens, and an eyepiece lens group, which includes a 3rd positive lens and 4th positive lens, arranged in this order from an object side, said eyepiece lens group being provided with a view frame on the object side surface, said objective lens group being provided with a half mirror on an eye point side surface, and satisfying the following condition:

$$LD/Lf \geq 2 \qquad (1)$$

wherein,

LD is a lens full length (distance from a 1st surface to an 8th surface), and

Lf is an eye relief (distance from the 8th surface to an eye point); and wherein said albada finder further satisfies the following condition:

$$1.4|fo| < |fL1| < 1.9|fo| \qquad (3)$$

$$1.9|fo| < |fL2| < 4.4|fo| \qquad (4)$$

$$1.1fe < fL3 < 1.8fe \qquad (5)$$

$$2.2fe < fL4 < 5.0fe \qquad (6);$$

wherein, fo is a focal length of the objective lens group,
fe is a focal length of the eyepiece lens group,
fL1 is a focal length of the 1st lens,
fL2 is a focal length of the 2nd lens,
fL3 is a length of the 3rd lens, and
fL4 is a focal length of the 4th lens.

* * * * *

UNITED STATES PATENT AND TRADEMARK OFFICE
CERTIFICATE OF CORRECTION

PATENT NO. : 5,317,451
DATED : May 31, 1994
INVENTOR(S) : Sachio HASUSHITA

It is certified that error appears in the above-indentified patent and that said Letters Patent is hereby corrected as shown below:

On the cover sheet of the printed patent, in section [56] References Cited, column 2, line 1, "change "12/1982" to ---12/1983---.

At column 8, line 45 (claim 2, line 32) of the printed patent, change "a length" to ---a focal length---.

Signed and Sealed this

Twenty-ninth Day of August, 1995

Attest:

BRUCE LEHMAN

Attesting Officer     Commissioner of Patents and Trademarks